3,687,832
PRODUCTION OF IMPROVED POLYMERIC
MATERIALS USING ELECTRICAL GAS
DISCHARGES
Peter John Fydelor, Wroughton, and Keith Victor Lovell,
Swindon, England, assignors to Surface Activation
Corporation, Westbury, N.Y.
Filed Nov. 23, 1970, Ser. No. 91,746
Int. Cl. B01k 1/00; C08; C08f 47/00
U.S. Cl. 204—165     13 Claims

ABSTRACT OF THE DISCLOSURE

A method of increasing the solvent resistance of the surface of a polymeric material by exposing the same to the active species formed by an electric discharge in a gaseous mixture at a pressure of at least 100 mm. of mercury with the gaseous mixture made up mainly of an inert gas such as argon and a minor proportion of another gas such as oxygen which modifies the active species in the discharge plasma.

The present invention relates to the production of improved polymeric materials by the use of electrical gas discharges. In particular, the invention concerns increasing the solvent resistance of polymeric materials and more especially the production of solvent-resistant surface layers on the surfaces of polymeric materials.

There have been several descriptions in the literature of the treatment of the surface of polymeric materials by corona or radio-frequency induced gas discharges, usually for the purpose of increasing the adhesive bond obtainable at the surface concerned. The gas pressures employed in this work have usually been low, for example of the order of a few millimeters of mercury. Some degree of crosslinking has been observed, together with chain scission and, where oxygen is present in the gaseous phase, oxidation of the polymer. It has also been proposed to treat, for example, the surface of polymeric films by passing them through a discharge between electrodes in air. In this process, one electrode is usually a roller having a dielectric coating of, for example, chlorinated rubber and the other a metal electrode. The yield of crosslinked material in relation to the power employed in such treatments is extremely low, so that prolonged exposure to the discharge is required to give even a small effect and the processes are thus not economically attractive.

We have now found that the use of a gaseous mixture conforming to the requirements set out hereinafter, in a pressure range embracing atmospheric pressure, enables much greater efficiencies, in terms of yield per unit of power consumed, to be obtained. As a result of the increased efficiency, polymeric products can be economically prepared having properties which have undergone much greater modification than was hitherto possible.

It is therefore a principal object of the present invention to provide a method for increasing the solvent and stain resistance of a wide variety of polymeric materials which has improved efficiency.

Another object is to provide such a process by which polymeric materials more highly modified than hitherto are economically provided.

Figure 1:
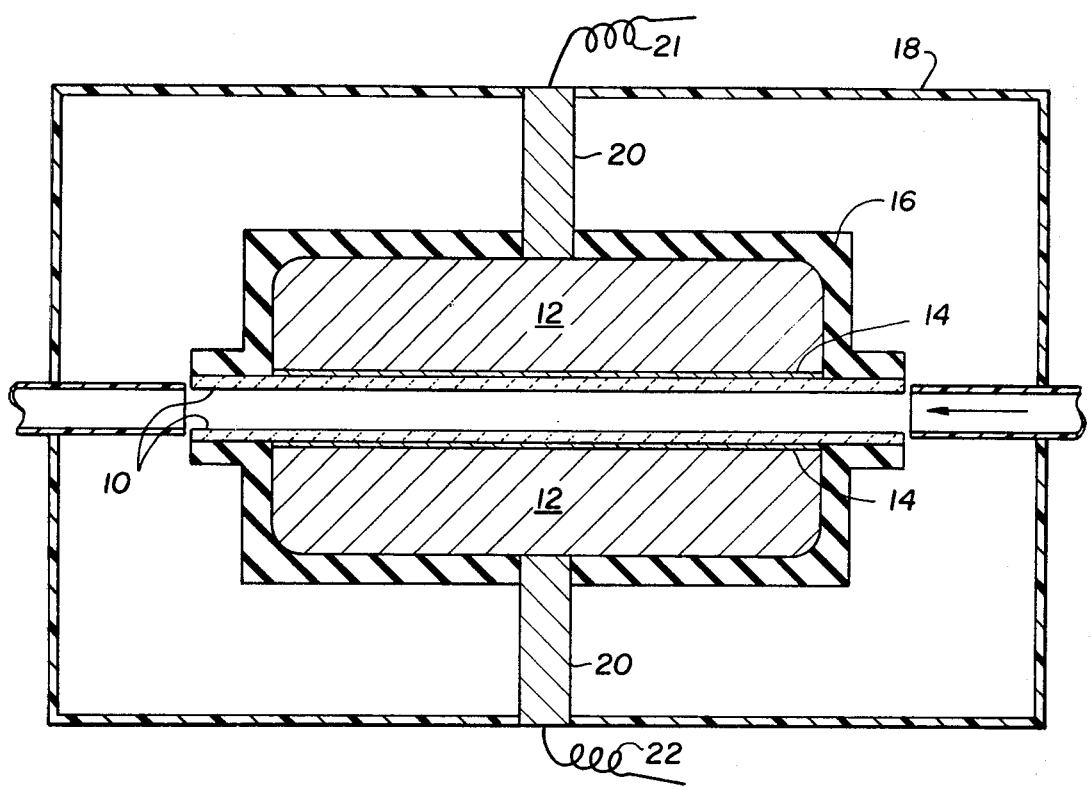
Figure 2:
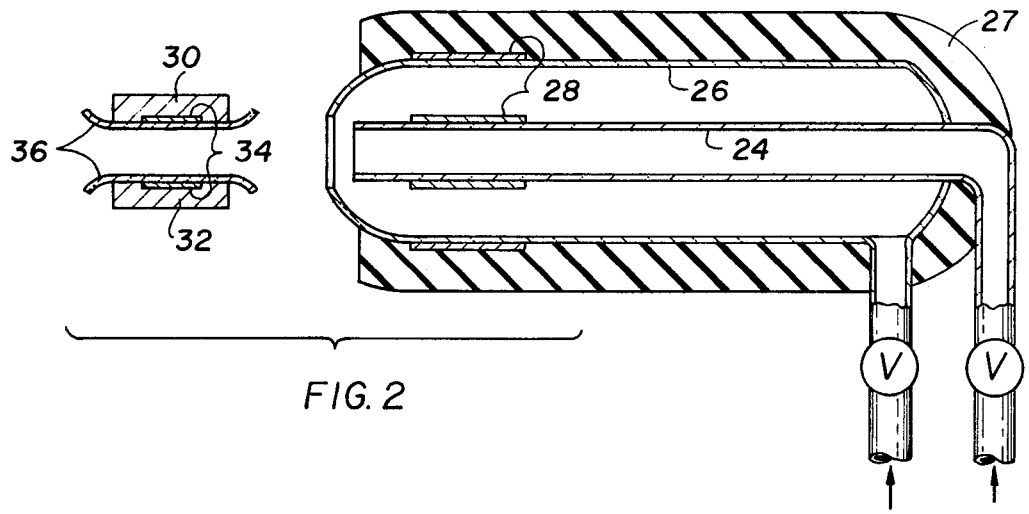
Figure 3:
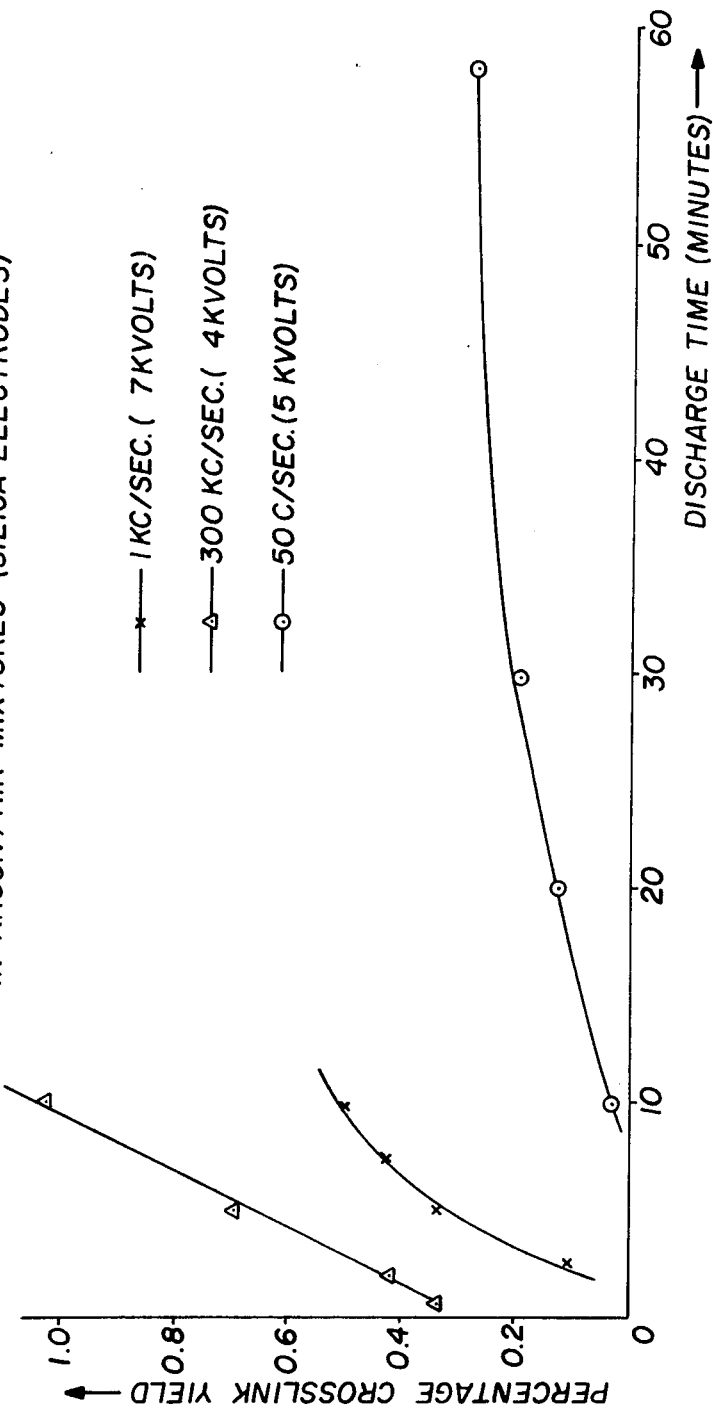

Further objects as well as advantages of the present invention will be apparent from the following detailed description thereof and the accompanying drawings in which FIG. 1 is a longitudinal cross-sectional view showing schematically one form of apparatus suitable for carrying out the present process;

FIG. 2 is a similar view of another form of apparatus suitable for carrying out the present process; and FIG. 3 is a graph showing the percent crosslink yield as a function of duration of the exposure to discharge for different electrical conditions.

Broadly stated, the method of the present invention provides polymeric material having increased solvent resistance by exposing a surface of the material to the active species formed by an electrically sustained discharge in a gaseous mixture at a pressure of not less than 100 mm. of mercury and comprising a major proportion by volume of an inert gas and a minor proportion of a further gas which modifies the active species in the discharge plasma. Without unreasonable consumption of power, it is possible to continue such exposure until a highly solvent-resistant surface layer is formed on the surface. By a highly solvent-resistant surface layer" is here meant not merely a layer of material which is not soluble on conventional treatment with a physical solvent for the polymer concerned, but one which is substantially inaccessible to and therefore not swollen or not permeated by such a solvent.

The formation of such a surface layer drastically modifies the surface properties of the polymer and provides a product having a variety of new and specialized applications. Treatment, in the manner described, of the surfaces of organic polymers containing additive plasticizing agents substantially reduces the migration and volatilization of plasticizers from the bulk of the material, thereby increasing the surface barrier properties thereof.

Any of the inert or "rare" gases may be employed as the inert gas component of the gaseous mixture, but argon is preferred on account of its relative cheapness. The further component may be any gas which raises the plasma "temperature" in the discharge, and for this purpose, oxygen is preferred, again on account of its ready availability. Other suitable gases may include carbon dioxide and oxides of nitrogen.

The exact mechanism by which oxygen and the other gases increase the efficiency of the process is not fully understood. Because oxygen is known to raise "temperature" in the discharge plasma, it is thought that the increased efficiency may be due to a local increase in the temperature in the polymer where bombarded by active species, whereas comparable bulk temperatures, achieved for example by heating the polymer or the gas, would be far less efficient in this respect.

When oxygen is employed as the further gas, the efficiency of the process, measured as crosslinking yield per 1,000 watts (kw.) consumed, increases with increasing oxygen concentration to a value between 5 and 20% by volume although the increase is not linear. Oxygen concentrations as low as 10 parts per million already show considerable increase in efficiency over a pure inert gas such as argon. Above 10% oxygen, increased power must be applied to maintain the discharge. Further increase in the oxygen concentration leads to a further rise in "temperature" of the gas mixture, and an excessive oxygen concentration may cause damage to the polymer surface or an undesirable increase in side reactions. Nevertheless, oxygen concentrations considerably above 10% can be satisfactorily employed, although they will be less economically advantageous than lower concentrations. With other gases the maximum preferred concentration may be lower than that for oxygen.

Nitrogen, which has an ionization potential only slightly above that of argon, differs in other respects from argon, and it has been found that an increasing nitrogen content in the gaseous mixture reduces the efficiency of the process. This reduction, however, is not so marked that it prevents the use of air as a source of oxygen.

The polymer to be treated may be in the form of a single body, for example a film or foil, which can be drawn between opposed, parallel, flat or roller electrodes for treatment. The process can, however, also be applied to the treatment of fine particles, either in a gaseous or in a liquid medium. In this case, a spray "gun" can be employed in which a stream of gas is passed between electrodes where the discharge is established, and a liquid suspension of the solid particles (for example, a so-called polymer "emulsion") is atomized into the gas stream either upstream or downstream of the discharge. Otherwise, for the treatment of liquids, apparatus must be employed in which a fresh thin film of the liquid medium is continually presented for bombardment by the active species.

According to the preferred aspect of the invention, the polymers employed are chlorinated polymers, since it has been found that the power requirement for these polymers to form highly solvent-resistant surface layers is lower than in the case of other polymers, such as hydrocarbon polymers. In other words, the efficiency of the process with respect to power is higher in the case of chloinated polymers than with other polymers. In the particular case of materials based on aliphatic chlorinated polymers such as polyvinyl chloride or polyvinylidene chloride, being either the chlorinated homopolymer or copolymers of these monomers with others, such as polyvinyl acetate, the crosslinking or polymerization reactions induced by the electrically sustained gas discharge may be facilitated by the incorporation of certain metal salt sensitizers in the polymers. Typical of such sensitizers are tin metal salts of the general chemical form $R_nSnY_{4-n}$ (R=alkyl group, Y=functional ester) which when admixed into polymeric compounds based on polyvinyl chloride can appreciably affect the nature of thermal induced reactions of the polymers.

In commercial practice, it is a great advantage to be able to operate the process at substantially atmospheric pressure, but good results can be obtained at pressures down to 100 mm. or above atmospheric. It is also preferred to employ a flow system for the gas. For industrial purposes, a closed system is most suitable, in which the gas passes through the zone where the discharge is maintained, and where the treatment of the polymer is conducted, and is then recycled, the apparatus being provided with means for determining the gas composition and for restoring the recycled gaseous mixture to the desired composition.

In commercial practice, a mixture of argon and air is preferred. The components of air will be desorbed from the gas conduits, the enclosure and the electrodes at the commencement of operations, and continually from the polymer if this is introduced on a continuous basis. Thus the argon concentration will tend to fall, and the composition can be restored either by topping up with argon or by scavenging out oxygen and nitrogen; either the argon or the oxygen concentration being monitored to control this operation. In starting, the most efficient argon-to-air ratio may be decided upon and the process commenced with an intake of gas too rich in argon in order to accommodate the initial desorption of air from the apparatus. Alternatively the whole apparatus may be degassed prior to commencement of processing.

A further preferred feature in the practice of the present process is the use of vitreous electrode materials, and more particularly of silica-containing materials. Among the preferred electrode materials are mica, borosilicate glass and silica. Other materials, for example polymers, show inferior performance as electrodes in this process although sheets of crosslinked polyethylene, polypropylene, polyvinyl chloride and silicone rubber have been employed with some degree of success. Metal electrodes have also been employed but in the case of these materials, it is generally found necessary to contour the electrodes or alternatively construct them as multi-spiked assemblies such as a "wire-brush."

For the treatment, on a large scale, of polymer surfaces between electrodes it has been found that silica or mica electrodes permit reliable operation at the necessary power levels. For the spray treatment of fine particles, relatively low power is employed so that the demands on the electrode material are less. In a "gun" employed for this purpose, an acceptable electrode material is borosilicate glass.

The crosslinking reactions have a positive activation energy, and an increase in temperature of the polymer surface therefore brings about an increase in yield. The extent to which the temperature may be safely raised depends on the polymer being treated, but, in general, and especially in the case of vinyl and vinylidene chloride polymers and copolymers, the polymer or the gas may be raised to a bulk temperature of about 100° C. In the case of treatment of a film, the treatment can be applied to the freshly formed film as it leaves the calender.

The improvement brought about by the invention in the solvent resistance of products manufactured from numerous polymeric materials, such as polyvinyl chloride, polyvinyl acetate, polyethylene and propylene, are of interest in the fields of wear-resistant and decorative products, such as wall and floor coverings and general upholstery. The improved stain and solvent resistance is especially advantageous in the case of paper-based wall coverings, floor tiles or calendered sheeting. Similarly, improved resistance to attack by solvents and swelling agents of polymeric film or foil products used in the packaging industry is advantageous in reducing penetration of greases, liquid or vapor through the packaging material. Applications in the field of packing of natural food products are particularly noteworthy.

The ability to render insoluble a normally soluble thin polymeric film by the method according to the invention may be utilized to prepare products having suitability in a wide range of applications for which the soluble form of the material has no value. Examples of this include the preparation of water-insoluble material from solvent cast films of polyethylene oxide, polyvinyl alcohol or polyvinylpyrrolidone. Formation of a crosslinked structure in polymeric materials is known to reduce the incidence of environmental stress cracking of manufactured products, and the formation of such a structure by electrical gas discharge treatment may permit an extension of the useful product life of many articles manufactured from polymeric materials.

Reductions in the rate of loss of added plasticizers from compounded polymeric products is advantageous in such fields as upholstery, floor coverings and packaging, as well as in some high temperature applications, such as electrical insulating coatings and moldings. Similarly, a decrease in the rate of build-up of liquid plasticizers on the surface of polymeric materials such as films, foils and upholstery materials will reduce the well-known "blocking" effect.

Apart from the production of highly solvent-resistant surface layers on solid polymeric materials, similar techniques and apparatus can be employed for other dimerization or cross-linking reactions in polymeric materials, for example materials which are normally semi-liquid as recovered from the polymerization process. This treatment can be used to render the polymers suitable for wider use by a reduction in "tack."

In putting the invention into practice, a discharge is normally maintained between two electrodes and is preferably of alternating rather than direct current. The discharge currents are generally low, being of the order of microamps to milliamps per square centimeter of electrode area, and the applied voltages may vary between some hundreds of volts to some tens of kilovolts. The values of both these electrical parameters will be partly dependent upon such considerations as the inter-electrode spacing and the nature and pressure of the gas phase.

The optimum frequency of the alternating current is similarly dependent upon the nature of the material to be treated and the nature of the inter-electrode gas phase. Measurable, though variable, modifications to all the polymeric organic materials here cited have been achieved at atmospheric pressure using air, nitrogen and argon as inter-electrode gases in the electrode assemblies later described for applied currents at frequencies between 50 cycles per second to 350 kilocycles per second; some experimental modifications to substrates have been obtained using microwave frequencies. But the results achieved using air and nitrogen as inter-electrode gases were far inferior to those obtained in accordance wtih the present invention.

The geometrical configuration and materials of construction of the gas discharge electrodes as well as the geometry and construction of the treatment cell as a whole, can vary widely. Two different, but typical, arrangements are shown in FIGS. 1 and 2 of the accompanying drawings by way of example.

FIG. 1 schematically represents one example of a parallel flat electrode assembly. The electrodes 10 are of a flat dielectric material, preferably silica as shown or mica may be used, and are supported on massive brass supports 12 which act as efficient heat-sinks. The electrical contact between electrode and support is achieved by means of conductive silver paint films 14 and the two are bonded together by encapsulation in air-cured silicone rubber 16. Alternatively, the electrodes can be mounted on water-cooled support assemblies.

The electrodes are mounted on rigid supports 20 which also function as lead-ins and are connected to leads 21, 22 which are in turn connected to a power supply (not shown). An enclosure 18 permits control of the gas atmosphere and can incorporate gas-tight ports for the continuous treatment of polymer film or foil strips, transported through the discharge area between the electrodes.

FIG. 2 schematically represents an example of a gas discharge assembly which has successfully been used to generate reactive species in a moving gas stream. The gas discharge is, in the first of two modes of operation, sustained between two concentric glass tubes 24 and 26, the outer of which is surrounded by silicone rubber insulation 27, the discharge area being defined by the extent to which the surface of the glass tubes are coated with conducting paint films 28. A mixture of gas (usually air and argon) with a liquid medium bearing the polymer to be treated is transported through the central glass tube 24 by pressure of gas acting upon a reservoir of the liquid. The outer annulus between the tubes 24 and 26 carries a gas mixture, conveniently of argon and air, which flows at a rate depending on the size of annulus. Active species, generated in the flowing gas by the electrical discharge, impinge on the liquid which is emerging from the assembly as a fine "aerosol" mist. In the second mode of operation, the gas discharge area is established at some distance from the region of mixing of gas and liquid, by means of flat electrodes 30 and 32 coupled by conductive paint films 34 to glass sheets 36, such that the "aerosol" droplets pass directly through the discharge area. This assembly, operated in both its modes, has been employed to modify polymeric materials in solution as suspensions in liquids and as emulsions in a water phase.

The nature and extent of modification of polymer systems treated in the aerosol spray assembly are dependent on the nature of the gas and on the voltage/current characteristics of the discharge in the same way as are polymer substrates treated in a parallel electrode assembly, but, additionally, are dependent upon the velocities of the flowing gas and the flowing liquid phase. This treatment technique has been found to afford considerable control of the various parameters which determine the nature and efficiency of the electrical gas-discharge-initiated reactions. Such assemblies having greatly different dimensions have been operated, and the gas flow rates have been varied between 5 and 50 meters per second.

In addition to the use of these and like assemblies for the modification of a polymeric material carried in a liquid phase, it has also been found that species generated between electrodes in a flowing or pressurized gas phase may be used to bring about desired chemical modification on the surface of a body of polymeric material. The aerosol spray assembly, utilized in either of its modes, is used to produce a beam or jet of gas containing active species by operating the assembly such that the required gas mixtures are transported through both the central glass tube and the other annular space at the rates that are applicable to the desired treatment. Specimens of solid or semi-solid polymeric material, such as polyvinyl chloride or polyethylene situated in the beam or jet of gas, have been chemically modified as by the generation of a crosslinked and highly solvent-resistant surface layer.

Underlying the invention is the observation that the efficiency for crosslink formation in such polymers are polyvinyl chloride as substantially greater in the case of gas discharge treatment than with ionizing radiation. An explanation of this greater efficiency is believed to be that the rate of deposition of effective energy in the surface layers of a polymer film is very high in the case of gas discharge treatment as compared with, for example, accelerated electrons in the energy range 150 kev. to 4.3 mev.

The following are examples of the application of the invention. In all the examples, percentages of gas mixtures are quoted by volume.

EXAMPLE 1

The gas-discharge cell assembly shown in FIG. 1 was employed to treat unplasticized 6 mil polyvinyl chloride film commercially available under the Trademark COBEX from B.X.L. Plastics Ltd., England.

The silica plate electrodes were first cleaned with ethyl alcohol and the samples of COBEX foil cleaned by wiping with a dry paper tissue. After assembly of the cell with the foil introduced between the plane parallel electrodes of effective area 100 sq. cm. and with an inter-electrode gap of 5 mm., the complete assembly was degassed for 2½ minutes by passing a stream of industrial grade argon through the 4 mm. internal diameter inlet port at a rate of 14 liters per minute. The cell assembly was then electrically connected to an oscillator/generator capable of delivering an alternating current of 300 kilocycles per second. With a mixture of industrial grade argon and 1% air flowing at a rate of 14 liters per minute, a timed discharge of 300 kilocycles per second was sustained for 3 minutes in the gas phase between the electrodes with an applied potential across the electrodes of $4\times10^3$ volts. The above procedure, with the exception of the electrode cleaning, was repeated for each of eight sample foils, and a ninth foil sample was gas discharge treated in an identical manner with the exception that after 1.5 minutes of sustained gas discharge, the sample foil was inverted face-to-face, again degassed, and then further treated for a time of 1.5 minutes.

On removal from the cell assembly, the sample foils were placed in envelopes in the absence of light and stored under normal room conditions of temperature, atmosphere and pressure, and controlled humidity. After various times, sections cut from each sample foil were weighed and then extracted with an excess of tetrahydrofuran at the boiling point for a period of 2 hours. The solvent insoluble residue was recovered, washed with hot solvent and carefully dried for 24 hours in the same dry atmosphere as they had been stored prior to weighing. The yields of solvent insoluble residue extracted from each gas discharged sample foil, expressed as a percentage of the total sample foil weights, were then taken to represent the "percentage crosslink yield" for any one treated sample, as has been accepted practice, and are expressed in the following table:

| Gas discharge treatment time | Time delay between treatment and solvent extraction | | Percent crosslink yield |
| --- | --- | --- | --- |
| | Minutes | Hours | |
| Minutes: | | | |
| 3 | 5 | | 0.393 |
| 3 | | 8 | 0.372 |
| 3 | | 16 | 0.381 |
| 3 | | 16 | 0.233 |
| 3 | | 16 | 0.384 |
| 3 | | 16 | 0.380 |
| 3 | | 20 | 0.367 |
| 3 | | 68 | 0.390 |
| 3 (foil inverted after 1.5 minutes) | | 16 | 0.385 |
| No discharge treatment | | | 0.000 |

Sections of the remaining gas discharge treated foils which had not been solvent extracted were submitted to solvent resistance tests as follows. Small aliquots of solvents, oils and greases were placed upon the surface of the sample foils, both discharge treated and untreated, and those aliquots of solvent which were volatilized at room temperature were repeatedly replaced by fresh solvent aliquots. The solvents, oils and greases applied were: (1) chemical reagent grades of tetrahydrofuran (THF), methyl ethyl ketone (MEK), acetone, chloroform, carbon tetrachloride, ethylene dichloride (ED); (2) laboratory prepared chromic acid, constituting a room temperature saturated solution of chromium trioxide in 1.84 sp. gr. sulphuric acid; (3) low viscosity mineral hydrocarbon lubricating oil; (4) a hydrocarbon grease (APIEZON L); and (5) a vacuum grease based upon polydimethylsiloxane.

Repeated additions of volatile solvents were conducted for 7 hours; the oils and greases were left in contact with the specimen foils for a period of 1 week.

In the case of the volatile organic solvents 1 and the chromic acid 2, the extent of attack to the surface or bulk of the sample foils was in all cases substantially less for the gas discharge treated specimens than for the non-discharged control foils. Particularly in the cases of the good solvents such as THF, MEK and ED, the control samples were partially dissolved throughout the bulk whilst the comparable gas discharge treated foils were visibly unaltered even on the surface. Staining of the surface by chromic acid was markedly less on the treated foils, and the apparent surface cracking induced by the oils and greases on the control foils was very much less evident on the treated foils.

EXAMPLE 2

Samples of the same polymer foils were treated as described in Example 1, but using as power sources (1) direct transformation of 50-cycle per second, 240 volt laboratory power supply to achieve high voltages, (2) a 1-kilocycle per second high voltage supply generated from a conventional laboratory signal generator amplified through a valve operated audio-frequency-range amplifier and step-up transformer, and (3) the 300-kilocycle per second oscillator of Example 1.

Estimates of the crosslink yield were obtained as in Example 1, and the results are presented in FIG. 3.

EXAMPLE 3

Two COBEX polymer sample foils were treated as described in Example 1 using a streamed argon or an argon and nitrogen gas phase between silica electrodes. In the case of both experiments, the cell and its enclosure were degassed or purged by passing the appropriate gas mixture at the rate of 14 liters per minute for a period of 5 minutes prior to initiating the electrical gas discharge. The two sample foils were both treated for 3 minutes with a potential of $3.0 \times 10^3$ volts applied to the electrodes, one in a gas mixture similar to Example 1 and the other sample foil in argon gas admixed with approximately 20% of oxygen free nitrogen. Following quantitative extraction in boiling THF, the foil treated in the argon plus oxygen atmosphere of Example 1 was found to be composed of 0.218 percent of crosslinked polymer whilst the foil discharged in argon contaminated with 20% of added nitrogen was found to be composed of only 0.068 percent crosslinked polymer.

EXAMPLE 4

The experiments here described indicate one way in which greater yields of crosslinked material may be obtained by the use of sensitizers.

Three alkyl tin salts have been incorporated into films prepared by solvent casting of additive free vinyl chloride homo-polymer.

The polymer, marketed as BREON 111EP, British Geon (British Petroleum), Great Britain, is a dispersion polymer of high average molecular weight. Four solutions of the polymer powder were prepared, a control comprising 20 g. of polymer in 100 ml. of THF and the other three being of the same polymer concentration to each one of which was added 1 ml. of a different liquid tin salt respectively representing the structures $R_1SnY_3$, $R_2SnY_2$ and $R_3SnY_1$. Equivalent thickness 4 mil solid films were prepared from the four solutions by casting onto clean glass plates at room temperature in a dust-free atmosphere, the resultant films were then degassed under vacuum at 50° C. for 48 hours to remove residual THF.

The films were subjected to identical 300-kilocycle per second gas discharge for a period of 3 minutes at a potential of $3.8 \times 10^3$ volts, and otherwise as described in Example 1. Boiling THF-insoluble crosslink yields were determined 66 hours after treatment giving the following results.

| Sample | Appearance of film after treatment | Percent crosslink yield |
| --- | --- | --- |
| Control film | Transparent water white. | 0.889 |
| Film containing monobutyl tin-tris-isooctyl thioglycollate. | do | 1.650 |
| Film containing dibutyl tin bis-iso-octyl thioglycollate. | Brown discoloration. | 0.778 |
| Film containing tributyl tin iso-octyl thioglycollate. | Considerable brown discoloration. | 0.760 |

All the sample films which had been treated in the gas discharge exhibited substantially improved resistance to solvents, oils and greases as compared with untreated films, when subjected to the test described in Example 1.

EXAMPLE 5

This example shows the extent to which the electrical gas discharge treatment of different polymers based upon polyvinyl chloride may yield very different degrees of crosslinked polymer.

A 300-kilocycle per second electrical gas discharge was performed as described in Example 1 with the exception that the electrodes were of soda glass (upper) and polyethylene (lower) which had been rendered more thermally stable by being irradiated in a $^{60}Co$ gamma radiation assembly. Sample films were prepared by (1) Room temperature casting from MEK solutions of two commercial polymer powders, BREON 425, a copolymer of 80% vinyl chloride with 20% of vinyl acetate, BREON 107, a low molecular weight homo-polymer of vinyl chloride, and (2) Room temperature casting on a cellulose paper, from an aqueous emulsion having 50% solid content of polyvinyl chloride, polyvinylidene chloride and perhaps one other polymer, solid under the designation BREON 652.

Whilst the rate of formation of crosslinked polymer induced by species in an electrical gas discharge can reach a maximum for some given polymeric materials of given thickness, the following are rates taken from the linear portion of the relationship between crosslink yield and time of discharge:

(a) A 1.5 mil cast film of BREON 425 discharge treated at an electrode current density of 2.6 milliamps per sq. cm. yielded a rate of 1.8 percent of crosslinked polymer per minute of discharge.

(b) A film as in (a) treated at an electrode current density of 1.2 milliamps per sq. cm. yielded a rate of 1.5 percent crosslinked polymer per minute of discharge.

(c) A 2.5 mil cast film of BREON 107 yielded a rate of $2.5 \times 10^{-1}$ percent per minute of discharge.

(d) A 1 mil film of BREON 652 cast on paper with slow air drying yielded a rate of 7.5 percent per minute of discharge.

(e) A film prepared as in (d) but subsequently dried in an airtight enclosure over excess anhydrous calcium chloride for a period of 5 days prior to discharge yielded a rate of $7.5 \times 10^{-1}$ percent per minute of discharge.

All the sample films which had been treated in the gas discharge exhibited substantially improved resistance to solvents, oils and greases as compared with their respective untreated control films when subjected to the tests described in Example 1.

EXAMPLE 6

This example shows the degree of inhibition of transport or volatilization of plasticizer in additively plasticized polymers based on vinyl chloride which is conferred by treatment of the polymer material in an electrically sustained gas discharge. The test applied to determine loss of volatiles from additively plasticized polymer films, foils and sheets was ASTM Test D1203–55. In this test, standard diameter circular test samples are heated at 70° C. for 24 hours whilst embedded in an excess of fresh granular activated charcoal. In all cases, the treated and the untreated control samples for any one series are placed in the same container for the duration of the 24-hour test.

In this example, three different types of commercially available, plasticized polymers based on polyvinyl chloride were utilized.

(1) Sheet samples prepared from a plastisol or "paste polymer" composed of 60 parts BREON 121 PVC homopolymer, with 40 parts DAP (dialkyl phthalate, $C_7$–$C_8$ alcohols), and 2 parts cadmium/barium stabilizer all suspended in a liquid phase. The sheet samples were prepared by casting the plastisol onto a clean glass plate and subsequently forming the sheet material by heating in a hot air oven at 165° C. for 10 minutes.

(2) Sheet samples prepared from a granular resin composed of 100 parts of BREON 112 EP PVC homopolymer, 43 parts of DAP, 6 parts tribasic lead stearate and 1.5 parts calcium stearate. Sheet samples were prepared by hot pressing at 170° C. between photographic glazing plates in an hydraulically operated press.

(3) PVC sheeting of unknown additively plasticized PVC composition.

Samples of the sheet materials were submitted to a 300-kilocycle per second electrically sustained gas discharge at a potential of $2.0 \times 10^3$ volts for various periods as described in Example 1 with the exception that the upper electrode was of borosilicate glass and the lower electrode of silica. After discharge treatment, standard diameter test pieces of the sheet were submitted to the ASTM D1203–55 test. In the case of the PVC sheeting, the test pieces were treated for 60 hours instead of 24. It was experimentally established that gas discharge treatment for 5 minutes did not reduce the weight of the sheet sample. Results for volatile loss were as follows:

| Polymer material | Thickness of sheet (mil) | Time of discharge (minutes) | Percentage weight loss in test | Percent crosslink yield |
|---|---|---|---|---|
| Plastisol | 45 | ¹0 | 6.54 | ND |
| Do | 45 | 0.5 | 5.90 | ND |
| Do | 35 | 2.0 | 4.45 | ND |
| Do | 70 | 5.0 | 0.38 | ND |
| Granular resin | 57.5 | ¹0 | 1.86 | ND |
| Do | 57.5 | 0.5 | 1.23 | ND |
| Do | 57.5 | 2.0 | 1.05 | ND |
| Do | 63.0 | 5.0 | 0.75 | ND |
| Do | 12.0 | ¹0 | 7.96 | ND |
| Do | 13.5 | 2.0 | 5.26 | ND |
| PVC sheeting | 5.0 | ¹0 | 2.0 | 0 |
| Do | 5.0 | 0.5 | 1.92 | 0.375 |
| Do | 5.0 | 2.0 | 1.36 | 0.612 |
| Do | 5.0 | 5.0 | 0.92 | ND |

¹ Control.

NOTE.—ND=Not determined.

EXAMPLE 7

This example demonstrates chemical modification of the surface or bulk of thin films of polyvinyl alcohol, with the formation of boiling-solvent-insoluble polymer. It has been discovered that the efficiency of the gas discharge initiated reaction is affected by the power dissipated in the discharge, the water content of the polymer film and upon the nature of the gas phase.

In these experiments, 1 mil sample films of low acetate unplasticized polyvinyl alcohol, being hot water soluble, were gas discharge treated at 300-kilocycles per second between plane parallel borosilicate glass electrodes as in Example 1. In the typical results which follow, the films were reversed at the half-time period for numbers 1 to 5 and not reversed for numbers 6 to 8.

| Number | Electrode potential (K volts) | Discharge time (minutes) | Percentage boiling water insoluble |
|---|---|---|---|
| Control | | | 0 |
| 1 | 3.5 | 3 | 8.5 |
| 2 | 2.5 | 4 | 1.2 |
| 3 | 2.5 | 10 | 48.5 |
| 4 | 4.2 | 10 | 100 |
| 5 | 4.0 | 10 | 98.0 |
| 6 | 3.0 | 2 | 2.4 |
| 7 | 2.5 | 5 | 36.2 |
| 8 | 6.0 | 1 | 14.2 |

All the sample films which had been gas discharge treated exhibited substantially improved resistance to water when used as solvent in the tests described in Example 1 as compared with the untreated control sample films.

EXAMPLE 8

In this example, active species in a moving gas stream generated by means of the apparatus described in FIG. 2 were employed to bring about chemical reaction in a polymeric material as an emulsion. An aliquot of 5:1 water diluted BREON 652 terpolymer emulsion was treated with the active species as aerosol droplets in a flowing argon/air mixture, using a low discharge current (less than 40 milliamps) and liquid flow rate of $1.1 \times 10^{-2}$ mls. sec.$^{-1}$. Upon subsequent extraction of the polymer solids with boiling MEK, it was found that between 2 percent and 5 percent of the BREON 652 polymer was insoluble.

EXAMPLE 9

Thin films of BREON 425, as described in Example 5, were cast from THF solution in the manner of Example 4. When these films were placed in atmospheric air at a distance of 5 mm. in line with the end of the aperture of the aerosol spray gun as shown in FIG. 2 and operated in the second mode as described hereinabove whilst electrically discharging only a mixture of argon and air for 1 minute, a visible blooming was seen to occur on the surface of the film over a circular area within a diameter of 7 mm. Extraction of the film in boiling THF as described in Example 1 showed that, apart from other chemical modifications to the polymer, the film surface within that 7 mm. diameter area was insoluble in boiling solvent.

Other polymeric materials which upon bombardment with species generated in the gas phase in an electrically sustained gas discharge have been shown to be rendered partly or totally insoluble in an excess quantity of boiling solvents and to exhibit substantially improved resistance to attack by solvents, oils and greases, as compared with the respective untreated polymeric materials, include polyethylenes (of both high and low density), polypropylenes (both stereochemically regular and stereochemically irregular), and polymethylmethacrylate.

The following example illustrates the modification which can be achieved in the case of predominantly atactic polypropylene, that is, stereochemically random polypropylene.

EXAMPLE 10

A thin film of atactic polypropylene was deposited onto a borosilicate glass plate by 100° C. vacuum deposition from a petroleum ether solution of solvent-purified atactic polypropylene homopolymer (reduced specific viscosity of polymer 0.3). The tacky polymer film on the plate was placed between silica electrodes and gas discharge treated at 300-kilocycles per second as described in Example 1 above for a time of 3 minutes. After treatment, the weighed polymer film was found to be tack-free and self-supporting, and, upon extraction in boiling petroleum ether, was found to be composed of 57 percent solvent insoluble yield.

EXAMPLE 11

This example demonstrates the modification to the active species in the gas discharge. In each of the following tests, Cobex polymer foils were treated as described in Example 1, but with the electrodes spaced 2 mm. apart. The foils were each subjected to a 300-kilocycle per second gas discharge for a period of 3 minutes on one side at a potential of $1.8 \times 10^3$ volts. Except as noted, the conditions of each test and the dimensions of the Cobex foil specimens were the same.

(a) The apparatus and specimens to be tested were degassed to 0.4 mm. Hg for 2.5 hours, then back filled with argon to 700 mm. Hg. The 3-minute discharge treatment of the Cobex specimen yielded 0.118% crosslinked polymer and the final electrode temperature was about 30° C.

(b) A second Cobex specimen was treated as in (a) and yielded 0.135% crosslinked polymer and a final electrode temperature of about 35° C.

(c) The apparatus and Cobex specimen were degassed to 1 mm. Hg for 45 minutes, then back filled with 12 mm. Hg oxygen, and then the pressure was increased to 550 mm. Hg by adding argon. The 3-minute discharge treatment of the Cobex specimen yielded 0.460% crosslinked polymer and a final electrode temperature of about 70° C.

(d) A second Cobex specimen was treated as in (c) except that the apparatus was back filled with 10 mm. Hg oxygen. The crosslinked polymer yield was 0.354%, and the final electrode temperature was also about 70° C.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a method of increasing the solvent resistance and surface barrier properties of a polymeric material, the steps of exposing a surface of a polymeric material selected from the group consisting of chlorinated polymer, polyvinyl alcohol and polyolefins for at least thirty seconds to the active species formed by an electrically sustained discharge in a gaseous mixture at a pressure of at least about 100 mm. of mercury, said gaseous mixture containing a major proportion by volume of argon and a minor proportion of a second gas which raises the temperature in the discharge plasma.

2. A method according to claim 1 in which the second gas is oxygen.

3. A method according to claim 2 in which the volumetric proportion of oxygen lies in the range of about 10 parts per million to 20 percent.

4. A method according to claim 3 in which the discharge is maintained by the application of an alternating potential of a frequency of 50 cycles to 350 kilocycles per second.

5. A method according to claim 2 in which the polymer is a polymer or copolymer of an unsaturated chlorinated hydrocarbon monomer.

6. A method according to claim 1 in which the polymer to be treated is in the form of fine particles suspended in a gaseous or liquid medium.

7. A method according to claim 1 in which the polymer to be treated is initially tacky and the tackiness is substantially reduced by exposure to the said species.

8. A method according to claim 1 in which the discharge is maintained between electrodes in a stream of the gaseous mixture and the polymer to be treated is exposed to the gaseous stream downstream from the electrodes.

9. A method according to claim 1 in which the second gas is air.

10. A method according to claim 1 in which the gaseous mixture is at least at about atmospheric pressure.

11. The polymeric material treated according to the process of claim 1.

12. The polymeric material treated according to the process of claim 2.

13. The polymeric material treated according to the process of claim 4.

References Cited

UNITED STATES PATENTS

| | | |
|---|---|---|
| 2,935,418 | 5/1960 | Berthold et al. _____ 204—168 |
| 3,030,290 | 4/1962 | Ryan _____ 204—169 |
| 3,069,286 | 12/1962 | Hall _____ 204—169 X |

J. C. EDMUNDSON, Primary Examiner

U.S. Cl. X.R.

204—323